Sept. 16, 1952 W. P. BOBBS 2,610,447
AUTOMATIC PATTERN CONTROLLED MACHINE TOOLS
Filed May 24, 1951 3 Sheets-Sheet 1

INVENTOR
W. P. BOBBS
PER
ATTORNEY.

INVENTOR
W. P. BOBBS
PER

ATTORNEY.

Sept. 16, 1952  W. P. BOBBS  2,610,447
AUTOMATIC PATTERN CONTROLLED MACHINE TOOLS
Filed May 24, 1951  3 Sheets-Sheet 3

INVENTOR
W. P. BOBBS
PER

ATTORNEY

Patented Sept. 16, 1952

2,610,447

UNITED STATES PATENT OFFICE 2,610,447

AUTOMATIC PATTERN CONTROLLED MACHINE TOOLS

William Peter Bobbs, Toronto, Ontario, Canada, assignor to A. V. Roe Canada Limited, Malton, Peel, Ontario, Canada, a corporation Application May 24, 1951, Serial No. 228,033

11 Claims. (Cl. 51—101)

The invention relates to machine tools and more particularly to automatic pattern controlled machine tools, utilizing rotary masterforms and workspindles.

In machine tools adapted to grind a workpiece to fine limits, it is the practice to use accurately machined slideways for slidably supporting the worktable and the tool head to permit the necessary relative movements of the grinding wheel and the workpiece. A machine tool incorporating such slideways is expensive to build; and, moreover, such slideways rapidly wear and lose their accuracy, since it is very difficult to prevent the entry of particles of grit from the grinding wheels of the machine. This necessitates frequent complete overhauls of the machine in an endeavour to restore the accuracy thereof.

One of the objects of the present invention is, therefore, to provide a machine tool which, whilst possessing the requisite degree of accuracy of operation, is of a relatively cheap and simple construction, and which, moreover, is protected against the entry of grit into the parts permitting relative movement of the tool head and the worktable, thereby insuring longer intervals between overhauls of the machine with a consequent saving in operating costs.

Due to the irregular shape of some workpieces, such as a blade of the turbine of a gas turbine engine, it is not possible to machine the whole blade surface using a constant rectilinear feed of the work table. A further object of the present invention is, therefore, the provision of an automatic pattern controlled machine tool incorporating means to permit such irregular shaped workpieces to be completely machined with one set up.

The above and further objects and advantages of the invention will become apparent from a perusal of the following description of some embodiments of the invention taken in conjunction with the construction illustrated in the accompanying drawings, in which.

The invention is described and illustrated with respect to the type of pattern controlled machine tool employing a rotary masterform carried by a worktable, which also supports corresponding rotated workpieces, and a follower wheel carried by a tool head, which also supports corresponding cutters, the said follower wheel scanning the masterform and guiding the cutters to reproduce the shape of the masterform on the workpieces. In such a machine tool the rotation of the masterform and workpieces corresponds to the necessary cutting stroke; relative movement between the masterform and workpieces on the one hand and the follower wheel and cutters on the other hand in a direction substantially normal to the axes of rotation of the masterform and workpieces constitutes the necessary "in and out" movement for the reproduction of the profile of the masterform; and relative movement between the masterform and workpieces on the one hand and the follower wheel and cutters on the other hand in the direction of the axes of rotation of the masterform and workpieces constitutes the necessary "index feed" for the complete reproduction of the masterform. The relative in and out movement need not be performed in a direction which lies exactly at right angles to the direction of the relative index feed movement, but it is sufficient if these two relative movements occur in two angularly related directions.

Figure 5:
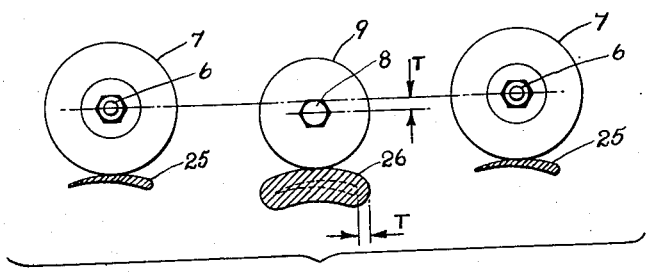
Figure 5 is a diagram illustrating the relative positions of the various spindles of the machine.

By reference now to the drawings, it will be seen that the frame of the machine consists of a base 1, in the form of a flat, rectangular casting, at each end of which is mounted an upright or stanchion 2. Secured to the top of each stanchion 2 is a standard pillar block 3 containing a standard ballbearing 4, the arrangement being such that the ballbearings 4 are in accurate, coaxial alignment. Pivotally mounted by means of the ballbearings 4 is an arch-shaped tool head 5. Journalled in suitable housings on the underside of the arch-shaped tool head 5 are a pair of tool spindles 6 to which are mounted grinding wheels 7. The tool spindles 6 are driven, through the intermediary belts and pulleys, by a pair of electric motors, mounted on the upper surface of the arch-shaped tool head 5. The tool spindles 6 are arranged equidistantly one on either side of the vertical centre line of the machine, and their axes are parallel and lie in the same plane. Also carried by the tool head 5 is a rotary follower spindle 8 arranged on the vertical centre line of the machine and having a follower wheel 9 mounted thereon. The follower spindle 8 is arranged parallel to the tool spindles 6 but, as illustrated in Figure 5, is disposed at a certain distance below the plane containing the tool spindles 6. The positions of the various spindles will be more fully described hereinafter.

Mounted on the front face of the tool head 5 is a suitable dressing mechanism 10 carrying a pair of diamond dressers which may be brought into operation to true the grinding wheels 7.

The stanchions 2 are connected and braced by a horizontal tube 11. The lower end of a vertically extending air cylinder 12 is pivotally mounted adjacent the centre point of the tube 11, whilst the upper end of the piston rod of the said cylinder is, in turn, pivotally connected to the end of an arm 13 secured to the tool head 5. Mounted coaxially on the said piston rod, inside the air cylinder 12, is a spring 14. The force exerted by the spring 14 is sufficient to cause the tool head 5 to pivot and raise the grinding wheels 7 and the follower wheel 9. During the operation of the machine the grinding wheels 7 and the follower wheel 9 are maintained in contact with the corresponding workpieces and masterform respectively, by the introduction of air under pressure into the lower portion of the air cylinder 12, through a suitable port and pipe. By regulation of the air pressure, the force maintaining the grinding wheels 7 and follower wheel 9 in contact with the corresponding workpieces and masterform respectively may be controlled. In order to obtain a satisfactory following action of the follower wheel 9 rolling on the rotary masterform, the centre of gravity of the tool head 5 is arranged almost directly above the pivotal axis thereof, and the distance from the points of contact of the follower and grinding wheels to the pivotal axis of the tool head 5 is made as short as is practical, thereby reducing as much as possible the moment of inertia of the tool head about its pivot.

Figure 2:
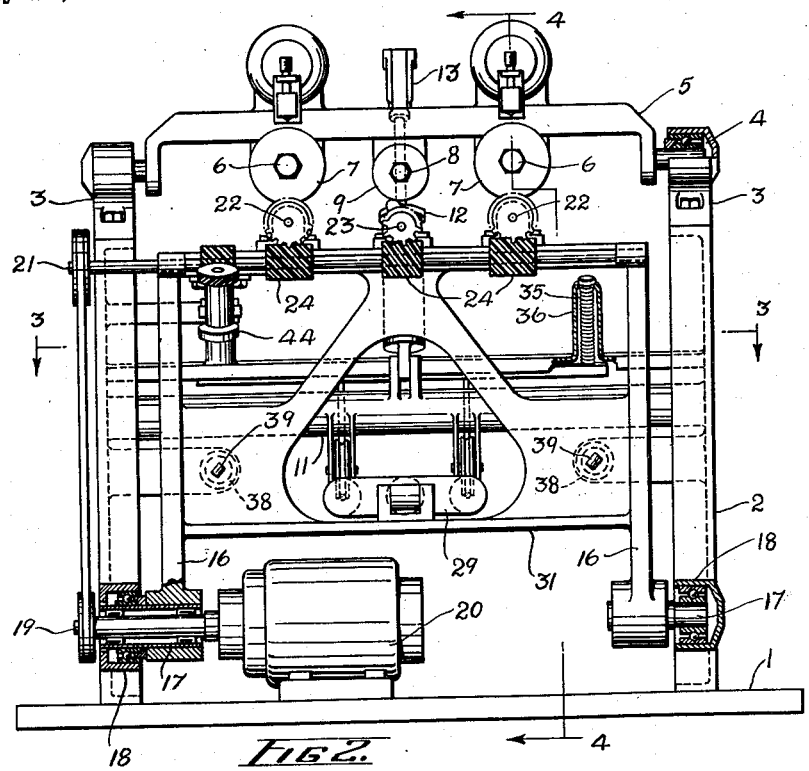
Figure 2 is a front elevation, partly in section.
Figure 3:
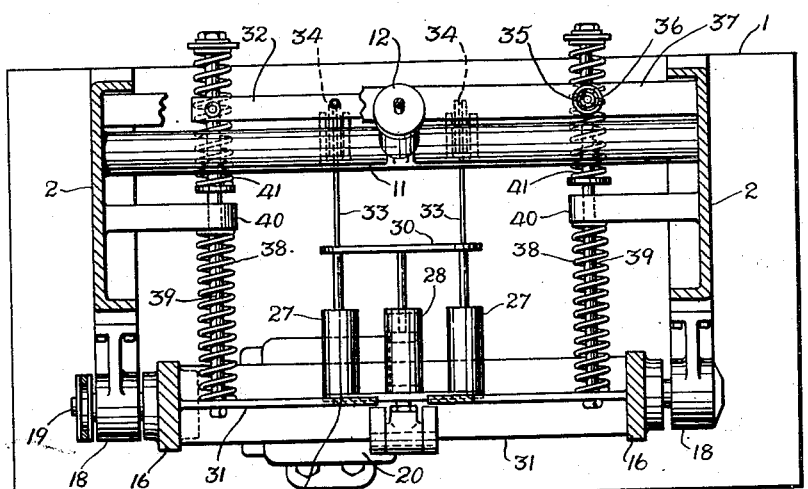
Figure 3 is a horizontal section on the line 3—3 of Figure 2.

A horizontal worktable 15 is disposed beneath the tool head 5, and consists of a casting having a pair of relatively long, downwardly extending, braced arms 16. Suitable trunnions 17 are coaxially secured in the lower ends of the arms 16 and are rotatably mounted in standard ballbearings supported in standard pillar blocks 18 bolted to the sides of the stanchions 2. As shown in Figure 2, one of the trunnions 17 is in the form of a tube and a driving shaft 19 is journalled in suitable bearings concentrically within the said tube. Mounted on the base 1 is a motor 20 incorporating an appropriate variable speed drive, and this motor is coupled to the driving shaft 19.

Journalled in suitable bearings provided on the front face of the upper part of the worktable 15, is a driven shaft 21 which lies parallel to the drive shaft 19 and is coupled thereto by suitable pulleys and a driving belt. The upper surface of the worktable 15 carries in appropriate bearings a pair of workspindles 22, a masterform spindle 23 and their corresponding live centres. These spindles 22 and 23 are arranged in the same relative positions as the tool and follower spindles 6 and 8, and are adapted to be driven by means of suitable worm gears 24 from the driven shaft 21.

The workpieces 25 for which the machine is set up are the rough machine forgings of the blades of a compressor of a gas turbine engine, and these workpieces 25 and a corresponding masterform 26 are held by chucks for rotation by the workspindles 22 and masterform spindle 23 respectively.

The workpieces 25 and masterform 26 are movable in the direction of their axes of rotation in relation to the grinding wheels 7 and the follower wheel 9 respectively by pivotal movement of the worktable 15 about the axis of the trunnions 17.

The drive for this movement of the table 15 is furnished by a pair of cylinders and pistons 27 operated by compressed air, the action of which is subject to the control of a hydraulic cylinder 28. The cylinders 27 and 28 are secured to a tie bar 29, whilst the piston rods of the said cylinders are secured to a yoke 30. The tie bar 29 is pivotally coupled to a bracket mounted on a cross member 31 connecting the arms 16 of the worktable 15, whilst the yoke 30 is coupled to a spring bar 32 by means of two cables 33 passing over pulleys 34 carried by brackets secured to the tube 11. The spring bar 32 is secured to and supported by the lower ends of a pair of tension springs 35 enclosed in cylinders 36 mounted on a horizontally disposed channel member 37 supported by the stanchions 2. The upper ends of the springs 35 are secured in any suitable manner to the upper ends of the cylinders 36. The springs 35 are each preset to have an initial tension, for example equivalent to a force of 400 lbs. and, therefore, the yoke 30 may be considered as rigidly connected to the frame of the machine during normal actuation of the table 15 by the air cylinders 27. The hydraulic cylinder 28, advantageously, includes a slow feed control for the worktable 15, and also an overriding control permitting rapid feed or return of the worktable 15.

The cylinders 27 are arranged to draw the worktable 15 towards the tool head 5, and this movement causes a pair of return springs 38 to be compressed. Each return spring 38 is mounted on a rod 39 which is pivotally connected at one end to the crossmember 31 and extends through a bore formed in a boss 40 secured to the inner surface of a stanchion 2. The rods 39 extend a certain distance beyond the bosses 40, and shock absorber springs 41 are mounted on these extensions of the rods 39 and retained thereon by suitable thrust washers and nuts. The shock absorber springs 41 provide a cushioned stop at the end of the return stroke of the worktable 15, and prevent damage to the mechanism should failure occur of the compressed air supply or any part of the drive of the worktable 15.

It will be realized that the use of a masterform having the same transverse section as the blade 25, would not give satisfactory operation due to the thin section of the blade, and would in any case necessitate very slow operation of the machine. As illustrated in Figure 5, the blade section is consequently enclosed in an envelope of uniform thickness "T," to produce the envelope master 26 which is more suitable for imparting the required following movements to the follower wheel 9.

In order to obtain correct reproduction when using an envelope masterform, it is necessary for the radius of the follower wheel 9 to be less than the radii of the grinding wheels 7 by an amount equal to the thickness "T" of the envelope of the masterform. Moreover, since in this machine the rise and fall of the grinding wheels 7 and the follower wheel 9 occurs in an arcuate path, it is necessary that the point of contact of the follower wheel 9 with the surface of the masterform 26 and the points of contact of the grinding wheels 6 with the surfaces of the workpieces 25 should all lie substantially on one and the same line which is parallel to the pivotal axis of the tool head 5. The follower spindle 8 is, consequently, as shown in Figure 5, disposed at a distance below the plane containing the tool spindles 6 which is substantially equal to the thickness "T" of the envelope of the masterform. This in turn necessitates that the masterform spindle 23 should be correspondingly arranged with reference to the workspindles 22. Such an arrangement ensures that the points of contact of the grinding wheels 7 with the workpieces 25 correspond substantially to the point of contact of the follower wheel 9 with the masterform 26 at all angles of inclination imparted to the tool head 5 during the rotation of the masterform 26.

In theory, due to the different diameters of the follower wheel 9 on the one hand and the grinding wheels 7 on the other hand, perfect reproduction will not be obtained when the axes of the follower and grinding wheels spindles are inclined to any extent to the axes of the spindles of the workpieces and the masterform. However, the discrepancy is small and it may be compensated for in various ways such as by raising the follower spindle 8 a small distance, for example, .020 of an inch, and by modification of the form of the envelope master 26; and it does not prevent the use of the machine tool for finish grinding such precision parts as the blades of the turbines and compressors of gas turbine engines.

In operation, the follower wheel 9 rolling on the profile of the envelope masterform 26 rotated by the masterform spindle 23 causes the tool head 5 to rise and fall, whereby the grinding wheels 7 cut the required profile on the workpieces 25 rotated in synchronism with the masterform 26 by the workspindles 22. The worktable 15 is fed in steadily to produce the index feed to ensure that the profile over the whole length of the blades is ground.

The distance of the work and masterform spindles 22 and 23 from the pivotal axis of the worktable 15 is made relatively large so as to minimize the change in angle which occurs, during the feed of the worktable 15, between the follower and grinding wheels on the one hand and the surfaces of the masterform and workpieces respectively on the other hand.

Figure 1:
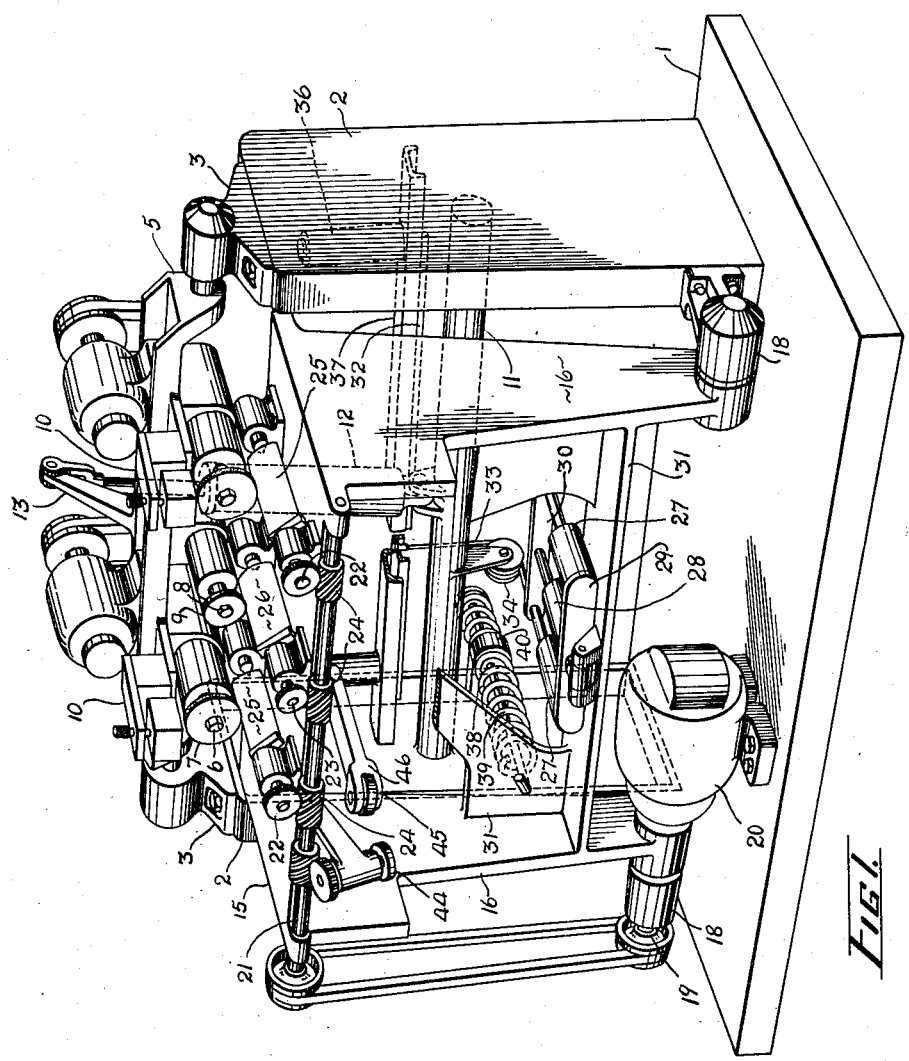
Figure 1 is a perspective view of a two spindle automatic pattern controlled machine tool, parts being shown broken away and in section to illustrate more clearly the construction of the machine.
Figure 4:
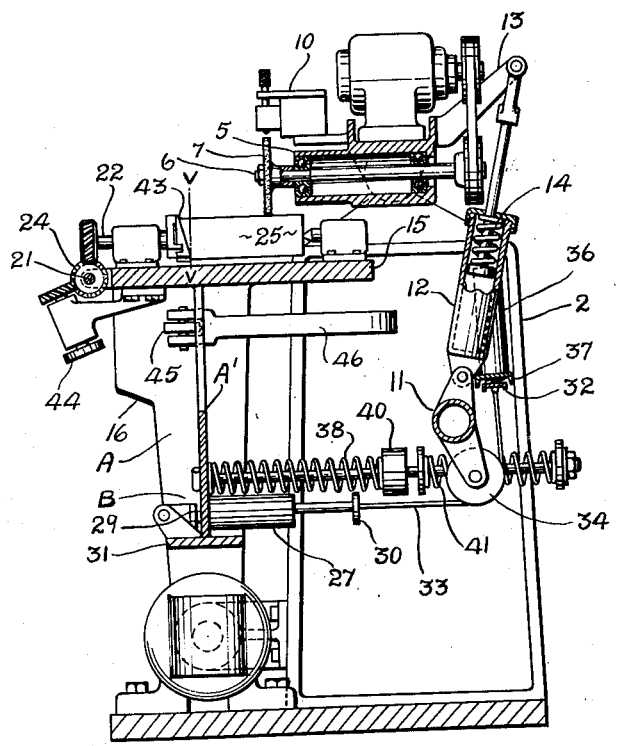
Figure 4 is a section on the line 4—4 in Fig. 2.

Due to the irregular shape of some workpieces, such as the compressor blade illustrated in Figure 4, it is not possible to grind the whole surface of the blade profile using a steady rectilinear feed of the worktable 15. The grinding operation can be readily accomplished up to the line V—V of Figure 4, but beyond this line, if a steady "in" feed of the worktable 15 is maintained, the grinding wheel 7 would cut into the inclined face of the root 43 of the blade during further rotation thereof by the workspindle 22. To prevent such an occurrence, a suitably designed cam 44 (Figures 1 and 4) is mounted in appropriate bearings beneath the worktable 15 and driven by means of gears from the shaft 21 in synchronism with the rotation of the workspindles 22. During the "in" feed of the worktable 15, when the grinding wheel 7 reaches the position on the blade indicated by the line V—V Figure 4, the cam 44 comes into contact with an abutment wheel 45 carried by a bracket 46 secured to one of the stanchions 2. The cylinders 27 maintain a steady "in" feed of the worktable 15 to permit the grinding wheel 7 to grind right up to the root 43 of the blade surface, but as the blade revolves, to prevent the grinding wheel 7 cutting into the root 43, the cam 44 bearing on the abutment wheel 45 forces the worktable 15 "out" away from the tool head 5, the previously described tension springs 35 extending to permit this movement of the worktable 15. It will be realized that by a suitable design of the contour of the cam 44, which is rotated synchronously with the blade, the whole of the surface between the line V—V and the root 43 can be ground, without damage to the root 43.

By the pivotal mounting, in accordance with the present invention, of both the tool head 5 and the workable 15, a relatively simple construction of automatic pattern controlled machine tool is realized. The pivotal mounting of the tool head and worktable by means of standard ball or roller bearings and pillar blocks to render the tool head 5 and worktable 15 movable, gives a far cheaper construction than if slideways were employed. Moreover, these bearings can be more readily protected against the entry of grit and the like, which, in the usual construction of grinding machine, rapidly causes deterioration of the accuracy of the slideways. When it does become necessary to overhaul a machine tool constructed in accordance with the present invention, it is much simpler and quicker to replace the ball or roller bearings by new ones than it is to try and restore the accuracy of worn slideways.

It is to be understood that various changes may be made to the shape, size and arrangement of parts of the above-described machine without departing from the scope of the invention.

For example, instead of obtaining a cutting stroke by rotation of the workpiece, as in the above-described embodiment of the invention, it may be advantageous in the case of some workpieces for the axes of the spindles of the follower wheel 9 and the grinding wheels 7 to be arranged normal to the axes of the spindles of the masterform and workpieces respectively, and to impart a relatively rapid reciprocatory motion to the worktable 15 to obtain the cutting stroke; a slow rotary motion of the workpieces and masterform about their axes constituting the index feed in such an arrangement.

The above described embodiments of the invention refer to the use of grinding wheels, but it is to be understood that other cutters, such as milling cutters or abrasive wheels, may be employed in machine tools constructed in accordance with the invention.

It will be realized that the lengths of the tool head 5 and the worktable 15 can readily be extended to accommodate several cutters and workpieces respectively. In some constructions it would be advantageous to employ, for example, a follower wheel and corresponding masterform at each end of the tool head and worktable respectively. It is consequently to be understood that the references in the following claims to a masterform, workpiece, follower, grinding wheel and cutter, in the singular, are not to be construed as excluding the use of more than one of each of the said parts.

What I claim as my invention is:

1. In a machine tool, a base, a tool head, a worktable having supporting arms extending therefrom at substantially right angles thereto, bearings on the base for pivotally supporting the said arms at the ends thereof, a spindle for a workpiece rotatably mounted on the worktable, a drive shaft, a bearing for rotatably supporting the drive shaft relative to the base substantially coaxial with the pivotal axis of the worktable, a drive shaft for the workpiece spindle rotatably mounted on the worktable with its axis substantially parallel to the axis of the first mentioned drive shaft, and a driving connection between the said drive shafts, whereby continuous rotating movement is imparted to the spindle during pivoting of the work table and at all positions thereof.

2. In a machine tool, a base, a tool head, a worktable having supporting arms extending therefrom at substantially right angles thereto, a pivotal mounting for the worktable, a spindle for a workpiece rotatably mounted transversely of the worktable, a drive shaft for the workpiece spindle rotatably mounted longitudinally of the table, a drive shaft, a bearing for rotatably supporting the last mentioned drive shaft relative to the base substantially coaxial with the pivotal axis of the worktable, a pulley on an end of each shaft, and a driving belt on said pulleys, whereby continuous rotating movement is imparted to the spindle during pivoting of the worktable and at all positions thereof.

3. In a machine tool, a tool head, a fixed frame on which the tool head is mounted, a worktable, a pivotal mounting for said worktable, a power jack on one of said worktable and frame including a cylinder and a piston and means for supplying fluid under pressure to the cylinder, a cable secured to the piston and to the other of said worktable and frame for moving the worktable relative to the tool head, and spring means for imparting a return movement to the worktable.

4. In a machine tool, a tool head, a fixed frame on which the tool head is mounted, a worktable, a pivotal mounting for said worktable, a power jack on one of said worktable and frame including a cylinder and a piston and means for supplying fluid under pressure to the cylinder, a control cylinder and piston, a yoke connecting the pistons of said cylinders, a cable secured to the yoke and to the other of said worktable and frame for moving the worktable relative to the tool head, and spring means for imparting a return movement to the worktable.

5. In a machine tool, a fixed frame, a tool head mounted on the frame, a worktable mounted on the frame for movement relative to the tool head, means for moving the worktable relative to the tool head, and means driven independently of the worktable to reverse the movement of the worktable, and yielding means in the worktable moving means to permit the reversal of the movement of the worktable.

6. In a machine tool, a fixed frame, a tool head mounted on the frame, a worktable, means for moving the worktable relative to the tool head, a cam on one of the worktable and the frame, means for rotating the cam, and means on one of the worktable and the frame engageable by the cam whereby rotation of the cam will cause a reversal of the movement of the worktable relative to the tool head.

7. In a machine tool, a fixed frame, a tool head mounted on the frame, a worktable, means for moving the worktable relative to the tool head, a cam on one of the worktable and the frame, means for rotating the cam, and yielding means on one of the worktable and the frame engageable by the cam whereby rotation of the cam will cause a reversal of the movement of the worktable relative to the tool head.

8. In a machine tool, a fixed frame, a tool head mounted on the frame, a worktable, means for moving the worktable relative to the tool head, a spindle for a workpiece rotatably mounted on the table, a cam on one of the worktable and the frame, means for rotating the cam in synchronism with the workpiece spindle, and means on one of the worktable and the frame engageable by the cam whereby rotation of the cam will cause a reversal of the movement of the worktable relative to the tool head.

9. In a machine tool, a tool head, a worktable, means for moving the worktable relative to the tool head including a driving member, yieldable means permitting movement of the worktable relative to the driving member, and means for engaging the worktable as it is moved to initiate relative movement between the worktable and the driving member.

10. In a machine tool, a frame, a tool head, a worktable, power means including a driving connection for moving the worktable relative to the tool head, a resilient element interposed in the driving connection, and means engaging the worktable to reverse the movement thereof and cause expansion of the resilient element.

11. In a machine tool, a worktable, a rotary spindle on said worktable for supporting a workpiece, a rotary spindle on said worktable for supporting an envelope masterform, a tool head pivotally mounted with respect to the worktable, a spindle on the tool head carrying a cutting wheel, and a rotary spindle on the tool head carrying a follower wheel the diameter of which is less than the diameter of the cutting wheel by an amount substantially equal to the thickness of the envelope of the masterform, the axes of the spindles of the follower and the envelope masterform being displaced relative to the axes of the spindles of the cutter and workpiece, respectively, sufficiently that the contact point of the follower with the masterform and the contact point of the cutter with the workpiece lie substantially on one and the same line which is parallel to the pivotal axis of the tool head.

WILLIAM PETER BOBBS.

REFERENCES CITED

The following references are of record in the file of this patent:

UNITED STATES PATENTS

| Number | Name | Date |
|---|---|---|
| 656,685 | Wilhelm | Aug. 28, 1900 |
| 808,260 | Stansbury | Dec. 26, 1905 |
| 962,274 | Van Eps | June 21, 1910 |
| 1,261,669 | Wright | Apr. 2, 1918 |
| 1,389,835 | Lecomte | Sept. 6, 1921 |
| 1,392,172 | Keller | Sept. 27, 1921 |
| 1,575,694 | Kuhn et al. | Mar. 9, 1926 |
| 2,087,687 | Houchin | July 20, 1937 |
| 2,184,175 | Blake et al. | Dec. 19, 1939 |
| 2,354,509 | Dreher | July 25, 1944 |